United States Patent Office 3,463,292
Patented Aug. 26, 1969

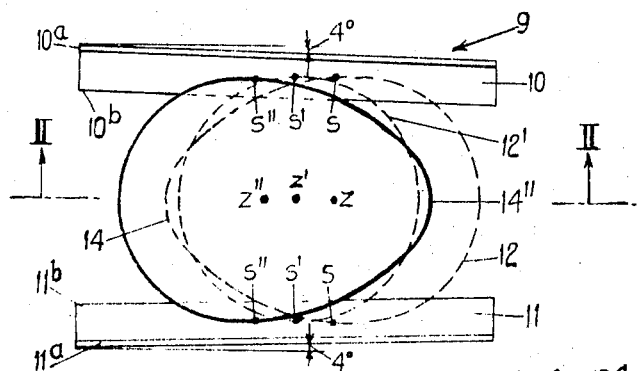
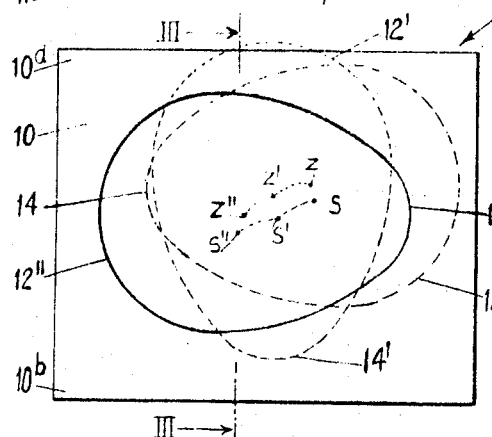
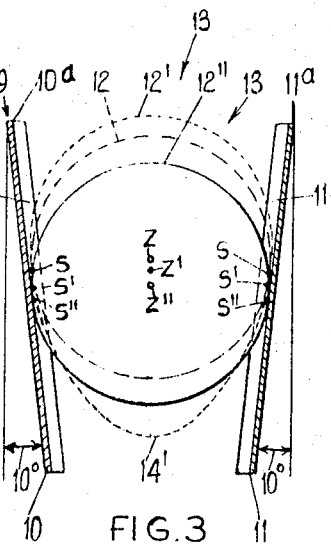

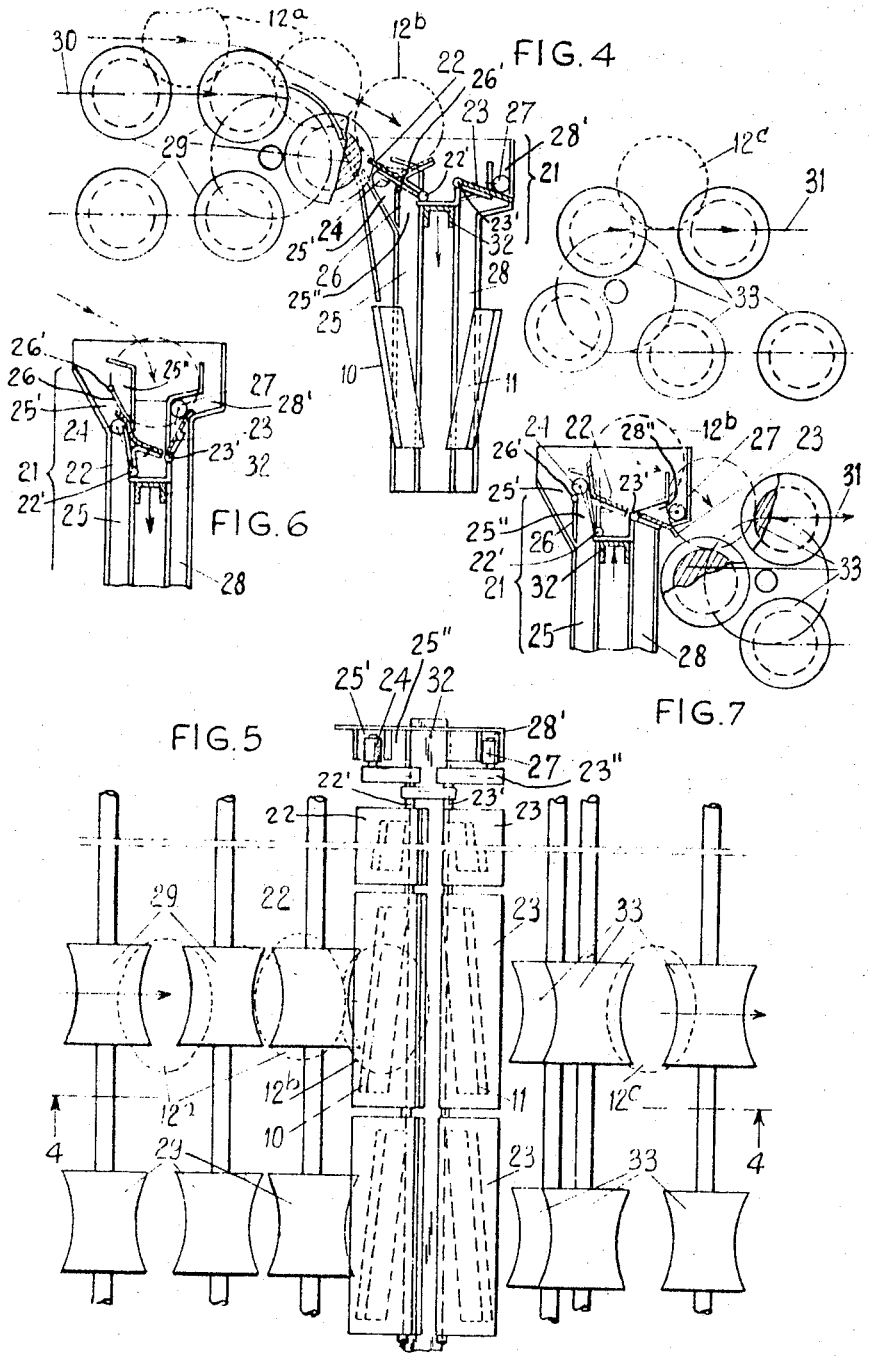

3,463,292
DEVICE FOR ALIGNING EGGS
Jan G. Booij, The Hague, and Halbe Algra, Papendrecht, Netherlands, assignors to Aviolanda Maatschappij voor Vliegtuibouw N.V., Papendrecht, Netherlands, a Dutch manufacturing company
Filed Apr. 21, 1967, Ser. No. 632,781
Claims priority, application Netherlands, May 3, 1966, 6605937
Int. Cl. B65g 47/24
U.S. Cl. 198—33                           7 Claims

ABSTRACT OF THE DISCLOSURE

Eggs are successively deliverd to an aligning device which supports the eggs such that they will gravitate to a position in which the axis of the egg is horizontally disposed with the small end pointing in one direction. The device consists of a pair of spaced plates which receive an egg therebetween and which present downwardly and laterally converging surfaces to effect the alignment action.

---

The invention relates to a device for the successive alignment of each of a number of eggs, the device comprising two lateral walls bounding an aligning space, the top and bottom edges of the walls being at a distance from one another which is respectively greater and smaller than the maximum transverse diameter of the egg to be aligned, the egg introduced into the aligning space automatically occupying a position such that its pointed end points in a particular direction.

A device of the kind specified is disclosed in Dutch patent specification 100,062, in which the egg is supplied to the aligning space with the longitudinal axis of the egg horizontal. As soon as the sides of the egg bear against the walls, it rotates by the force of gravity with its pointed end downwards, since the egg seeks a position in which is centre of gravity is as low as possible. The centre of gravity of a normal egg lies between the line through the place of contact with the wall and the pointed end of the egg, at any rate as long as the vertical divergence of the walls is correctly chosen. However, if an egg is not normal—i.e., its centre of gravity lies substantially on the line through the place of contact with the walls—in the prior art device, during alignment the abnormal egg remains lying in a horizontal position. In the prior art device the egg is removed from the aligning space at the bottom, the two walls moving apart after the alignment. The egg is then received in a holder which takes the egg to a release station, where it is deposited in a compartment of a box. In the prior art device an abnormal egg has catastrophic consequences, since it is received in the holder with the longitudinal axis of the egg horizontal and is of course also released with its longitudinal axis horizontal. The egg breaks either when it is received in the holder, or when it partly knocks against an adjacent egg in the box. Apart from the fact that every broken egg means a loss, it dirties the egg-processing machine of which the aligning device forms part, so that the machine has to be stopped. Many eggs are also spoilt between the breakage and the stoppage of the machine. Due to the possibility of breakages, the prior art device requires extra care, and disturbances to operation reduce the capacity of the egg-processing machine.

The invention provides an improved device of the kind specified which obviates the aforementioned disadvantages by the fact that the walls converge in the horizontal direction. An egg arriving in the aligning space automatically has its pointed end disposed in the direction in which the walls converge horizontally. If the egg already has its pointed end pointing in the right direction, it remains in that position. Even an abnormal egg remains lying in the same position. The final result is that all normal eggs which are introduced successively one by one into the same aligning space and are removed therefrom after alignment in the same manner either by hand or other suitable means, have their pointed ends disposed in the same direction, while the longitudinal axes of both normal and abnormal eggs are parallel. The eggs can therefore be further processed without any risk of damage.

The invention also relates to a device for the inspection of eggs, in which a number of devices for the alignment of eggs are disposed parallel with one another. The invention improves a device of the kind specified for the inspection of eggs, since according to the invention a number of aligning devices are disposed in parallel upstream of the inspection station. By means of this device, large numbers of eggs can be examined with equal care. The examiner gets a clear picture, since all the eggs are disposed horizontally and in the same direction. A faulty egg is very noticeable, since it disturbs the normal pattern. The examiner can observe more readily, for instance, whether the air chamber is at the correct end of the egg. The eggs can pass the inspection station supported on rotating rollers, so that they revolve during inspection. The examiner can therefore observe the eggs on all sides.

These and other features of the invention will now be described with relation to the accompanying diagrammatic drawings, wherein:

FIG. 1 is a plan view of a device according to the invention to approximately the natural scale, showing three stages in the alignment of an egg;

FIG. 2 is a side view of the device shown in FIG. 1;

FIG. 3 is a vertical section, taken along the line III—III in FIG. 2;

FIG. 4 is a side view, to a reduced scale and partially sectioned along the line 4—4 in FIG. 5, of a device further developed according to the invention, during the reception of an egg supplied;

FIG. 5 is a plan view of the device shown in FIG. 8;

FIG. 6 is a detail of the device shown in FIG. 8 during the supplying of an egg to the aligning space, and FIG. 7 is a detail, corresponding to FIG. 6, during the ejection of an aligned egg.

Referring to FIGS. 1–3, the device according to the invention comprises two walls 10, 11 disposed at such a distance from one another and so converging downwardly that an egg 12 for alignment can be introduced from above, but cannot descend between the walls to the bottom—in other words, the distance between the top edges 10a, 11a of the walls 10, 11 is greater, and the distancer between the bottom edges 10b, 11b is smaller than the maximum transverse diameter of the egg 12.

The walls 10, 11 converge in the horizontal direction (to the right in FIGS. 1 and 2). If the egg 12 is deposited, for instance by hand, in a position shown in chain-lines in an aligning space 13 laterally bounded by the walls 10, 11, the egg 12 bears via its places S of contact against the walls 10, 11. Since the centre Z of gravity of the egg 12 is higher in this position than the supporting places S, the egg 12 tilts through a vertical position 12', shown in chain-lines and having a centre Z' of gravity and places S' of contact, into a position 12" shown with a solid line and having a centre Z" of gravity and places S" of contact. Since the centre Z" of gravity is to the right of the places S" of contact, and the contents of the egg, which are displaced in relation to the shell, damp the tilting movement, the egg remains lying in the position 12". The pointed end 14" of the egg 12" is pointing to the right. If an egg is directly deposited in the aligning space in the position 12″, the egg remains lying in that position. Even an abnormal egg which is symmetrical in the longitudinal direction remains lying in substantially the same position. An abnormal egg occupies a somewhat inclined position, in which one of its ends is somewhat higher than the other end, but this is no disadvantage. After alignment the egg is removed from the aligning space 13, for example by hand, but preferably by mechanical means. At the same time the longitudinal axis of the abnormal egg resumes the horizontal position.

FIGS. 4–7 illustrate an embodiment developed according to the invention. A lifting device 21 comprises a support 32 which can be driven up and down in the aligning space and bears at the feed side a carrying member 22 which can be pivoted around a horizontal axis defined by a shaft 22′ and has a concave carrying surface, and at the removal side a flap 23 which can also pivot around a horizontal axis. The position of the carrying member 22 and the flap 23 is regulated in relation to the support 32 by means of crank arms 22″ and 23″ on the shafts 22′ and 23′ and associated cam followers 24 and 27, as shown in FIG. 5 cam follower 24 operates in the guideway 25 which is so constructed that during the upward movement of the support 32 the roller 24 extends first vertically and when it reaches a position clearing the top of the gate 26, it will flop of its own weight to the receiving position shown in FIG. 4. After reception of an egg (FIGS. 4 and 5) downward movement of the carrier 32 will cause the follower 24 first to pass through the guideway portion 25′, pivoting the gate 26 aside about its pivot 26′, so that the support 32 pivots from the position shown in FIG. 4 to the position shown in FIG. 5. At the same time the follower 27 passes downwardly through the dog-leg portion 28′ of its guideway 28, causing the flap 23 to pivot from its FIGURE 4 position to its FIGURE 5 position whereby the carrying member 22 and the flap 23 cooperate to form a cradle for lowering the egg between the alignment members 10 and 11. After the egg is aligned, the support returns on its up stroke and once again the carrying member 22 and the flap 23, forming the aforementioned cradle, reengage the egg and lift it from between the members 10 and 11. Toward the end of the upstroke, as is shown in FIG. 7, the follower 24 remains in the upper vertical extension 25″ of the guideway 25 while the roller 27 enters the dog-leg 28′ so that the flap 23 pivots to one side and delivers the egg by gravity to the concave rollers 33 of the removal conveyor 31. Completion of the upstroke of the support 32 carries the follower 27 up into the confines of the vertical portion of the dog-leg 28′ while again clearing the follower 24 over the top of the gate 26 so that the parts once again assume the positon shown in FIG. 4 wherein the next egg delivered by the concave rollers 29 of the delivery conveyor 30 may be received in a concave carrying member 22. Obviously, any suitable drive may be employed to synchronize the movements of the conveyors 30 and 31 with the movements of the support 32.

Preferably, as shown in FIG. 5, a number of aligning devices 10, 11 having lifting devices 21 and feed and removal conveyors 30, 31 are disposed in parallel. In that case, the supports 32, the carrying members 22, the flaps 23 and the conveyors can be coupled to one another, and only one set of regulating means 24, 25, 27 and 28 is required. If necessary a set of regulating means can be disposed on each side of the aligning machine. Preferably, a number of conveyors 31 convey aligned eggs 12c in parallel rows along an inspection station. In the resulting device for the inspection of eggs, the eggs pass the inspection station with their pointed ends in the same direction. This gives the examiner a better view. A faulty egg is more noticeable than in an inspection device in which the pointed ends of the eggs are pointing in two different directions.

It should also be noted that the carrying rollers 29 of the feed conveyor 30 are somewhat shifted in the direction of the convergence of the walls 10, 11 in relation to the rollers 33, preferably over a distance corresponding to half the displacement of an egg 12b due to its tilting during alignment. The eggs are therefore more satisfactorily received by the removal rollers 33.

The aligned eggs can also be inspected in succession, sorted in accordance with size or weight and finally packed. During one of these processes or during transportation between processing stations, the eggs are then placed on their pointed ends by means of a forced movement. This can be done, for instance, by each egg rolling separately in the horizontal position into a holder (not shown in detail) which is subsequently so tilted through 90° that the pointed end of the egg is at the bottom, and the holder lowers the egg into the appropriate compartment of a packing. A device whose walls 10, 11 have the vertical and horizontal convergence shown in FIGS. 1–3 is extremely adequate for aligning different qualities of eggs. The top and bottom edges of the walls 10, 11 enclose an angle of 4° with the horizontal longitudinal axis of the aligning space, and the angle between each wall 10, 11 and the vertical plane is 10°.

Lastly, the aligning device is preferably disposed upstream of the sorting device, so that a special aligning device is not required for each class of eggs.

What we claim is:

1. A device for the successive alignment of each of a number of eggs, the device comprising two lateral walls bounding an aligning space, the top and bottom edges of the walls being at a distance from one another which is respectively greater and smaller than the maximum transverse diameter of the egg to be aligned, the egg introduced into the aligning space automatically occupying a position such that its pointed end points in a particular direction, said walls converging in the horizontal direction, and a lifting device for ejecting each aligned egg from the top of the aligning space.

2. A device as set forth in claim 1, wherein before the aligning of the egg, the lifting device receives it above the aligning space, lowers it and releases it during alignment.

3. A device as set forth in claim 1 wherein the lifting device comprises a vertically adjustable support, a flap adjustable on the support, and regulating means, and during the upward movement of the support, the regulating means pushes the flap out of a supporting position, in which the flap supports the egg and fixes it in at least one of the transverse directions, into an ejection position in which the flap is disposed outside the removal path of the egg, and during the downward movement of the support the regulating means pushes the flap out of the ejection position into the supporting position.

4. An apparatus as set forth in claim 3, wherein the lifting device also comprises a carrying member which can be adjusted on the support and has a hollow carrying surface, and during the upward movement of the support, the regulating means pushes the carrying member out of a supporting position, in which it co-operates with the flap to support the egg and fix it in the other transverse directions into a receiving position, in which it carries the egg supplied without the co-operation of the flap, and during the downward movement of the support the regulating means pushes the carrying member out of the receiving position into the supporting position.

5. A device as set forth in claim 1 including conveying means for conveying to the aligning space the eggs to be aligned, and conveying means for removing aligned eggs from the aligning space, characterised in that the first-mentioned conveying means are offset laterally in the direction of the horizontal convergence of the walls in relation to the last mentioned conveying means.

6. An egg aligning machine comprising, in combination, egg aligning means for aligning eggs with their axes horizontal and their small ends pointing in one direction, means for delivering randomly oriented eggs successively to said egg aligning means, and means for transporting aligned eggs from said egg aligning means, said egg aligning means comprising a pair of generally upright plates disposed in horizontally spaced relation, said plates being inclined with respect to each other in both downward and horizontal direction with the spacing at their portions being sufficient to receive eggs therebetween with the spacing at their lower portion being close enough to retain the eggs, and means for transferring said eggs, while preserving their alignment, from said egg aligning means to said means for transportation.

7. The egg aligning machine according to claim 6 wherein said plates are flat and are disposed in fixed spaced relationship with respect to each other.

References Cited

UNITED STATES PATENTS

| | | | |
|---|---|---|---|
| 3,118,548 | 1/1964 | Bliss et al. | 198—33 X |
| 3,126,993 | 3/1964 | Van der Schoot | 198—33 X |
| 3,258,045 | 6/1966 | Mattos et al. | 193—43 X |
| 3,370,692 | 2/1968 | Mosterd | 198—33 |

EDWARD A. SROKA, Primary Examiner